United States Patent [19]

Moerke

[11] Patent Number: 4,600,824
[45] Date of Patent: Jul. 15, 1986

[54] ARC WELDING SYSTEM AND DOCKING ASSEMBLY THEREFOR

[76] Inventor: Delford A. Moerke, 1020 Shady Oak Dr., North Mankato, Minn. 56001

[21] Appl. No.: 648,967

[22] Filed: Sep. 10, 1984

[51] Int. Cl.$^4$ .............................................. B23K 9/32
[52] U.S. Cl. ............................ 219/137.63; 219/137.31
[58] Field of Search ........... 219/137.2, 137.31, 137.42, 219/137.62, 137.63, 137.9, 125.1; 174/15 C, 15 WF; 228/179

[56] References Cited

U.S. PATENT DOCUMENTS

| | | | |
|---|---|---|---|
| 3,196,249 | 7/1965 | Thostrup | 174/15 WF X |
| 3,324,225 | 6/1967 | Thostrup | 174/15 WF X |
| 3,496,328 | 2/1970 | Moerke | 219/137.2 |
| 3,775,584 | 11/1973 | Moerke | 219/137.63 |
| 4,049,943 | 9/1977 | Pratt | 219/137.63 X |
| 4,158,763 | 6/1979 | Moerke | 219/137.42 |
| 4,210,796 | 7/1980 | Moerke | 219/137.63 |
| 4,549,068 | 10/1985 | Kensrue | 219/137.31 X |

FOREIGN PATENT DOCUMENTS 90942 10/1983 European Pat. Off. ............ 219/132

Primary Examiner—Clarence L. Albritton
Assistant Examiner—C. M. Sigda
Attorney, Agent, or Firm—Emrich & Dithmar

[57] ABSTRACT

In a MIG arc welding system, a docking body having utilities passages therethrough is mountable at the welding station. Means are provided at one end of the body for accepting incoming utilities such as consumable wire electrode, shielding gas, welding potential and cooling water. Different types of welding gun or torch assemblies are interchangeably manually mountable and demountable at the other end of the welding body without disturbing the docking body or the utilities coupled thereto. Plug-type water fittings on the welding gun or torch assembly are receivable in receptacles in the docking body which communicate with the water passages, actuator tips on the fittings actuating normally-closed, spring-biased check valves in the passages to prevent leakage of water from the docking body when the welding gun or torch assembly is demounted. The gun or torch assembly is held in place by a coupling nut which is threadedly engaged with the docking body. There are provided a fixed-mount embodiment, wherein all utilities but the welding wire enter the docking body radially, and a remote or movable mount embodiment, suitable for mounting on a movable mechanized or robotic support, wherein all utilities enter the docking body axially. A positioning ring on the latter embodiment accurately positions the docking body on the movable support.

20 Claims, 25 Drawing Figures

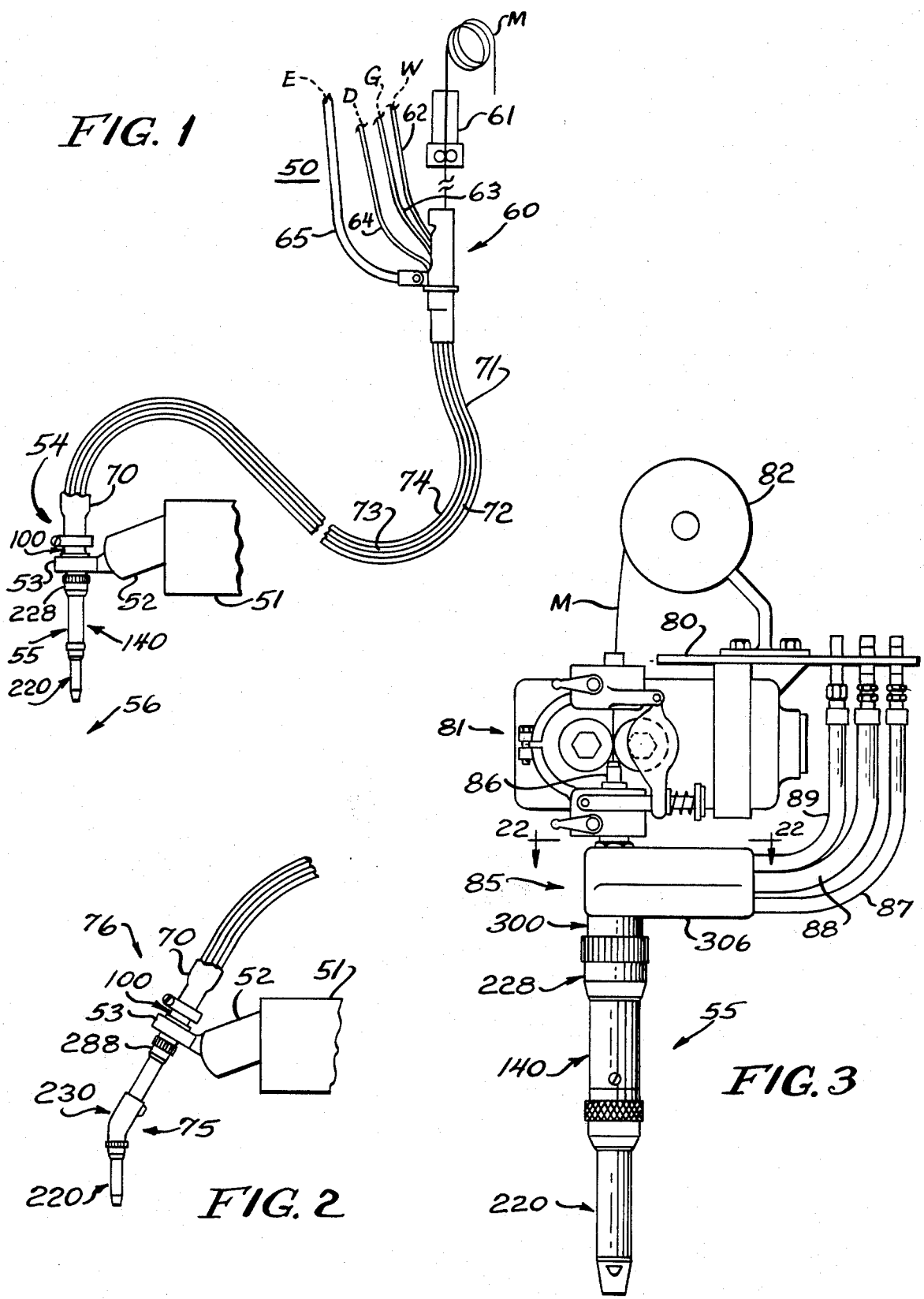

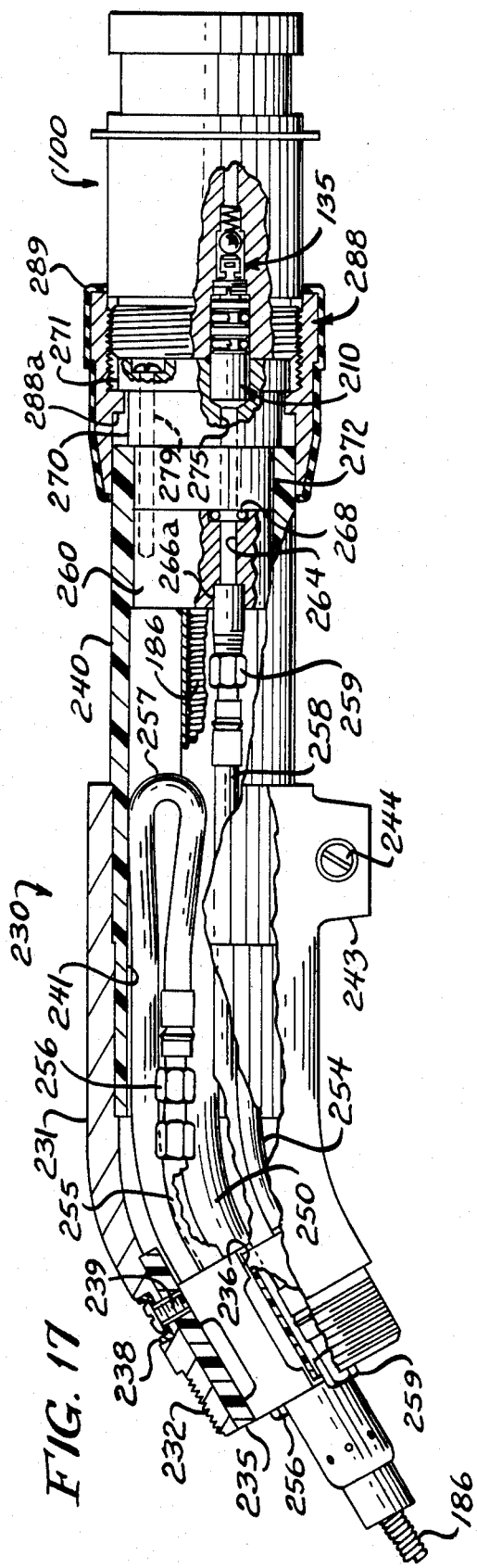
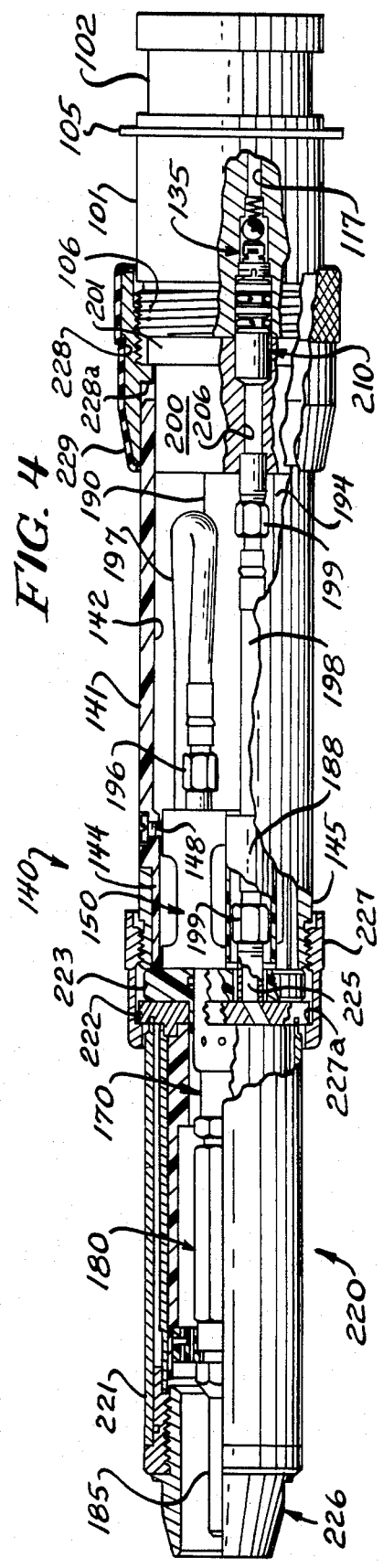
FIG. 17
FIG. 4

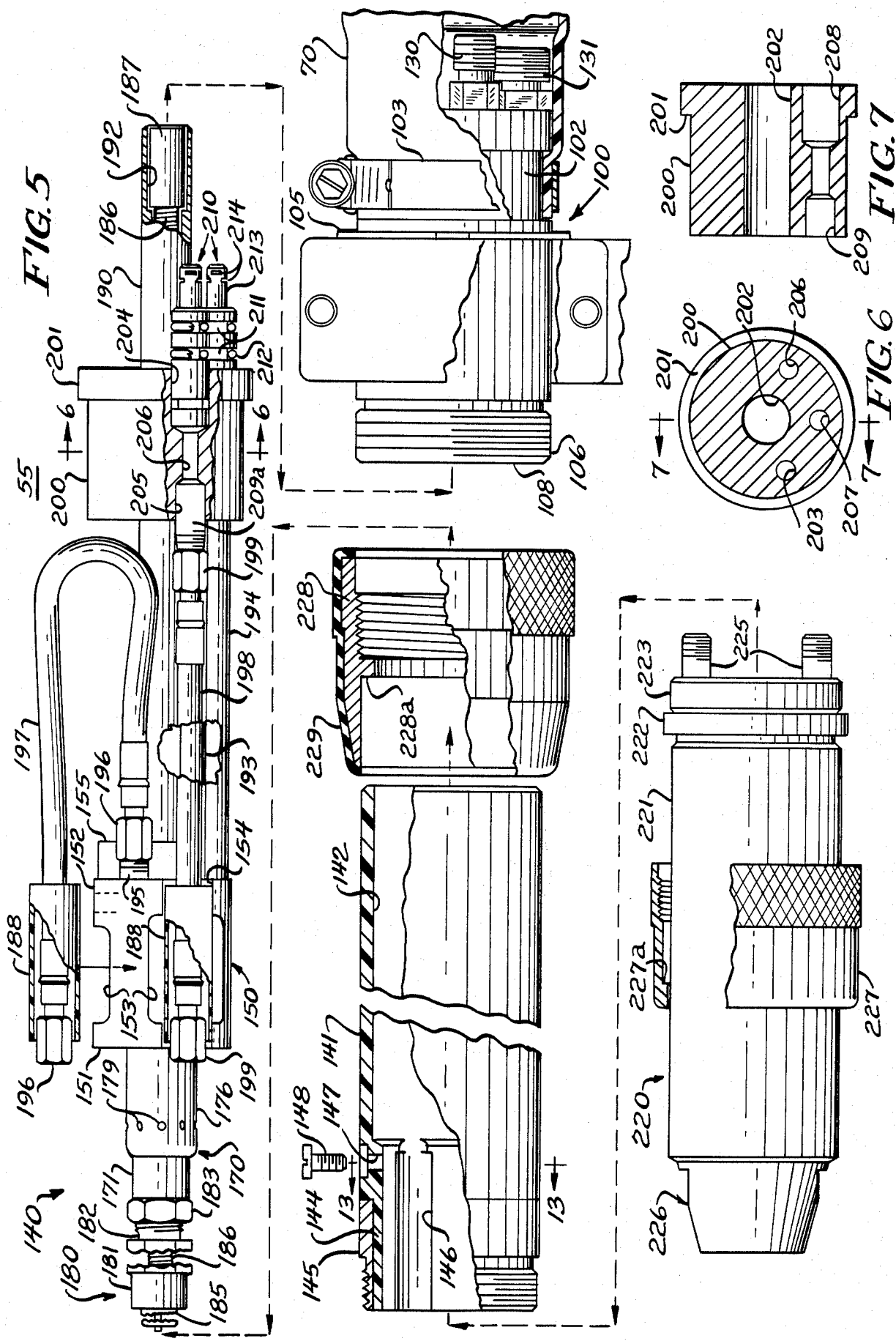

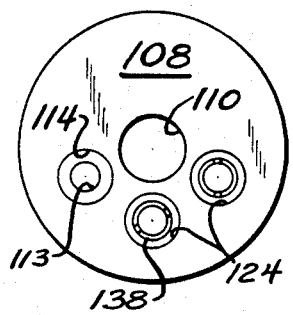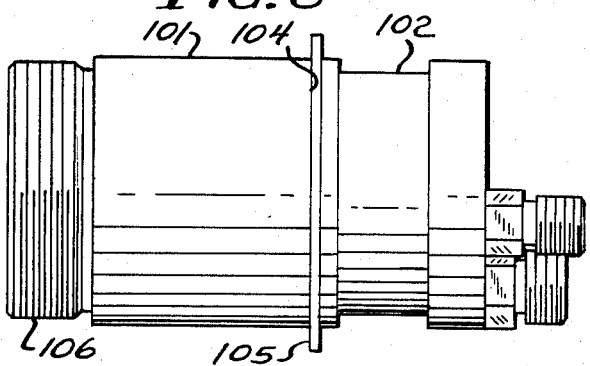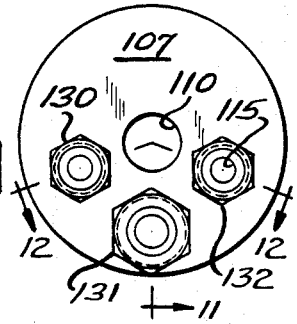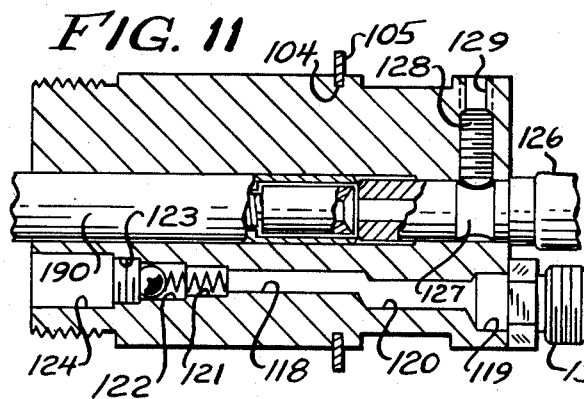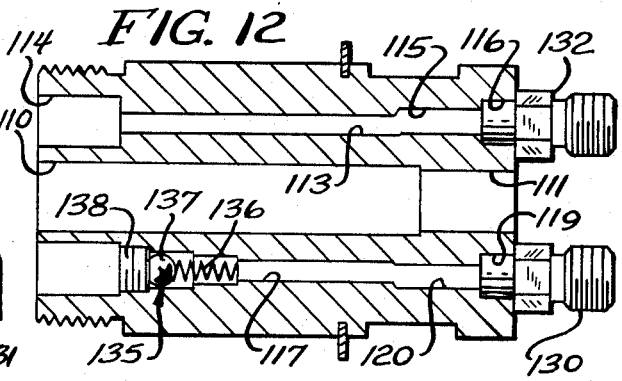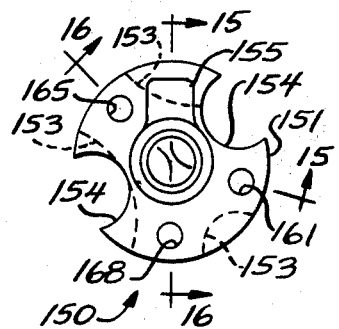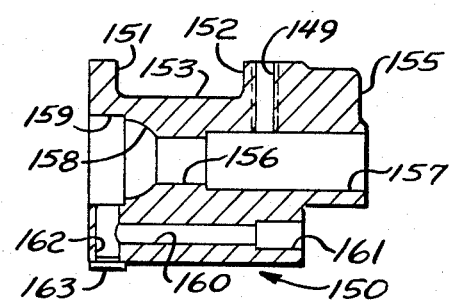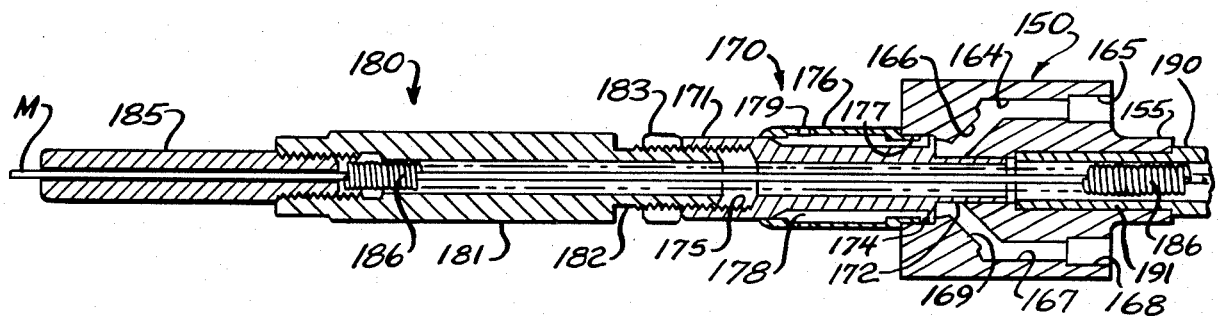

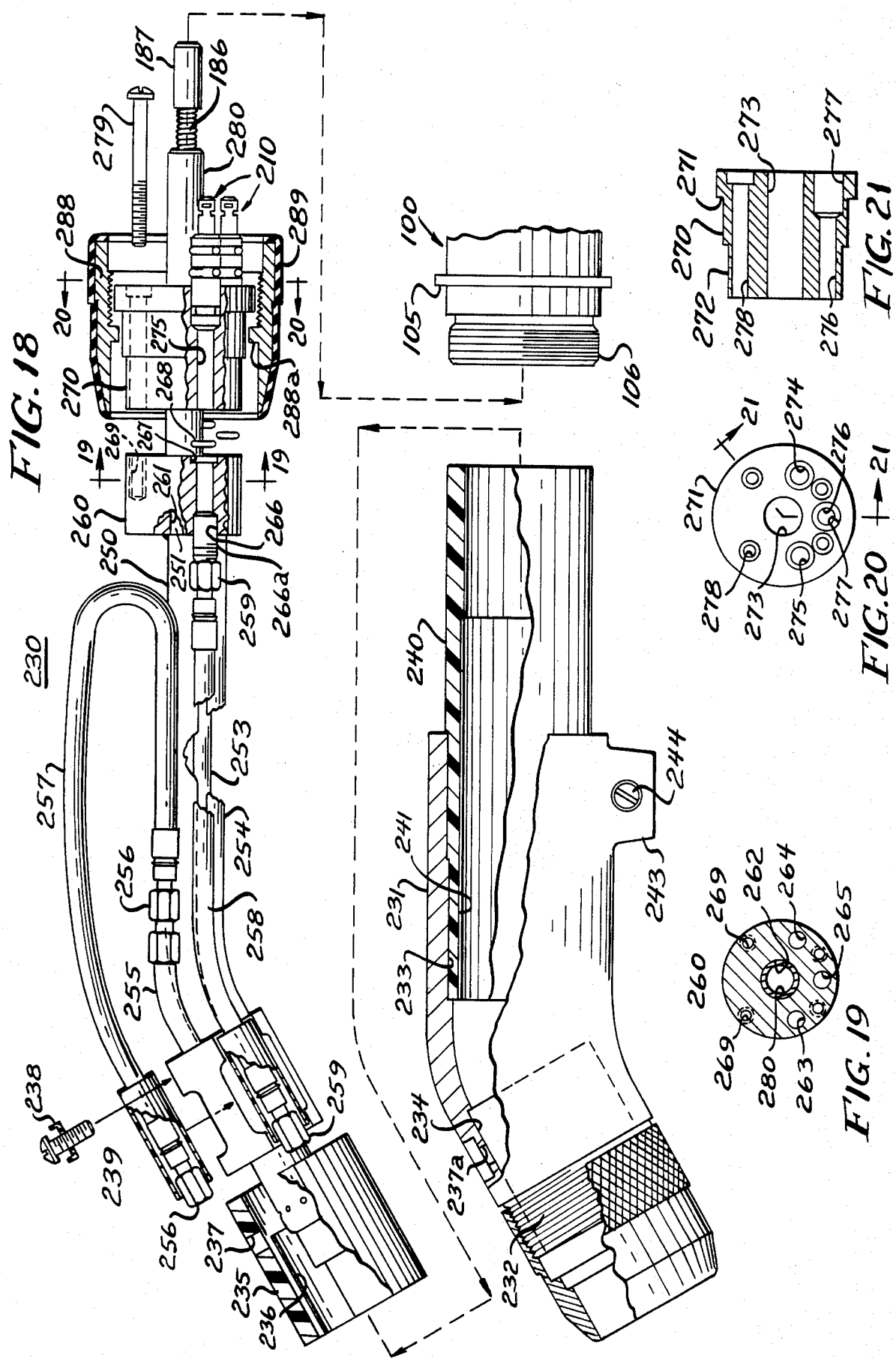

ARC WELDING SYSTEM AND DOCKING ASSEMBLY THEREFOR

REFERENCE TO RELATED APPLICATION

The present invention is related to the docking assembly disclosed in my copending U.S. application Ser. No. 648,966, entitled "ARC WELDING SYSTEM AND DOCKING ASSEMBLY THEREFOR", filed on even date herewith, the disclosure of which application is incorporated herein by reference. The invention of that application may be used interchangeably with the present invention in the same system.

BACKGROUND OF THE INVENTION

The present invention relates to welding apparatus and systems, particularly Metal Inert Gas ("MIG") arc welding systems. The invention relates particularly to arc welding systems of the type utilized in mechanized and robotic welding.

Typically, a MIG welding system includes a welding gun or torch assembly which feeds a consumable wire electrode through a current pick-up tip which applies welding potential to the electrode. Such welding gun assemblies may, for example, be of the types disclosed in my U.S. Pat. Nos. 3,496,328 and 3,775,584. The gun assembly includes a main body or housing to which is removably mounted a welding nozzle which surrounds the welding tip and channels an inert shielding gas to the welding arc. The nozzle may be air or water cooled. The welding gun assembly must be serviced with the utilities which it requires for operation, such as water for nozzle cooling, gas for shielding the welding arc and electricity to effect the welding, as well as being provided with the consumable wire electrode. All of these utilities are fed to the welding gun assembly from associated supplies via utilities delivery means, which may include a portable utilities station of the type disclosed in my U.S. Pat. No. 4,210,796.

When the welding system is to be utilized in mechanized or automated applications, the welding gun assembly is fixedly mounted on the automated welding control equipment. For example, the welding gun assembly may be mounted on a permanent fixed mount to which workpieces are delivered for welding or, alternatively, might be mounted on a movable mount such as that of a robotic welding machine, which moves to the workpiece under remote control, and which may be pre-programmed.

In such prior welding systems, the replacement of the welding gun assembly or parts thereof is extremely inconvenient, particularly in the automated or robotic applications. Thus, for example, in the event of system malfunction or damage to the welding gun assembly, it is necessary to replace the complete assembly, including all the utilities delivery means all the way back to the wire drive system. This is a very costly procedure, not only because it is time consuming, but also because it may, particularly in factory applications, require the involvement of several different tradesmen, such as electricians, plumbers, welders and the like.

Furthermore, in robotic welding applications, the replaced welding gun assembly will not be in precisely the same location and orientation with respect to the robot unit as was the original gun assembly. Since this precise positioning is critical to maintenance of a pre- programmed welding path, the system must be recalibrated at the cost of additional time and expense.

SUMMARY OF THE INVENTION

It is a general object of the present invention to provide an improved welding system which avoids the disadvantages of prior systems while affording additional structural and operating advantages.

An important object of the invention is the provision of a docking assembly which permits a welding gun assembly to be mounted and demounted at a welding station, without affecting the utilities delivery means upstream of the welding station.

In connection with the foregoing object, it is another object of this invention to provide a welding system which includes a docking assembly of the type set forth and a number of manually interchangeable welding gun assemblies.

Still another object of the invention is the provision of a docking assembly of the type set forth which permits accurate positioning of a replacement welding gun assembly in a welding system.

It is another object of the invention to provide a docking assembly which permits ready mounting and demounting of a welding gun assembly at the welding station without spillage of cooling fluid.

These and other objects of the invention are attained by providing a docking assembly for an arc welding system including a welding gun assembly disposed at a welding station and having utilities inputs for receiving from associated delivery means utilities such as welding voltage, arc shielding gas, consumable wire electrode and cooling fluid, the docking assembly comprising: a docking body disposed at the welding station and having utilities passages therethrough, means connecting the docking body to the associated utilities delivery means and receiving into the passages the wire electrode and the fluid utilities, first coupling means on the docking body, and second coupling means on the welding gun assembly, the first and second coupling means being removably engageable with each other for mounting the welding gun assembly on the docking body in a mounted condition with the utilities applied to the utilities inputs of the welding gun assembly, whereby the welding gun assembly can readily be mounted and demounted at the welding station without affecting the utilities delivery means upstream of the welding station.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a fragmentary side elevational view of a welding system including a welding gun assembly and a docking assembly constructed in accordance with and embodying the features of a first embodiment of the present invention;

FIG. 2 is a view similar to FIG. 1 of a welding system including the same docking assembly as in FIG. 1, but with a different welding gun assembly mounted thereon;

FIG. 3 is a side elevational view of a welding system incorporating a docking assembly in accordance with a second embodiment of the present invention;

FIG. 4 is an enlarged, fragmentary, side elevational view of the welding unit of FIG. 1, in partial section, and rotated 90° counterclockwise;

FIG. 5 is a further enlarged, fragmentary, partially exploded, side elevational view of the welding unit of FIG. 4;

FIG. 6 is a view in vertical section taken along the line 6—6 in FIG. 5;

FIG. 7 is a view in vertical section taken along the line 7—7 in FIG. 6;

FIG. 8 is a side elevational view of the docking spool and associated fittings of the welding unit of FIG. 5;

FIG. 9 is an end elevational view of the docking spool of FIG. 8, as viewed from the left-hand end thereof;

FIG. 10 is an end elevational view of the docking spool of FIG 8, as viewed from the right-hand end thereof;

FIG. 11 is a view in vertical section taken along the line 11—11 in FIG. 10;

FIG. 12 is a sectional view taken along the line 12—12 in FIG. 10;

FIG. 13 is a view in vertical section taken along the line 13—13 in FIG. 5;

FIG. 14 is an end elevational view of the inner body structure of the machine barrel assembly of FIG. 5, as viewed from the right-hand end thereof;

FIG. 15 is a fragmentary sectional view taken along the line 15—15 in FIG. 14;

FIG. 16 is a sectional view taken along the line 16—16 in FIG. 14;

FIG. 17 is an enlarged, fragmentary side elevational view of the curved gun assembly of FIG. 2, in partial section and rotated about 45° clockwise;

FIG. 18 is a fragmentary, partially exploded side elevational view of the curved gun assembly of FIG. 17;

FIG. 19 is a view in vertical section taken along the line 19—19 in FIG. 18;

FIG. 20 is an end elevational view of the coupling spool taken generally along the line 20—20 in FIG. 18;

FIG. 21 is a view in vertical section taken along the line 21—21 in FIG. 20;

DESCRIPTION OF THE PREFERRED EMBODIMENTS

Figure 22:
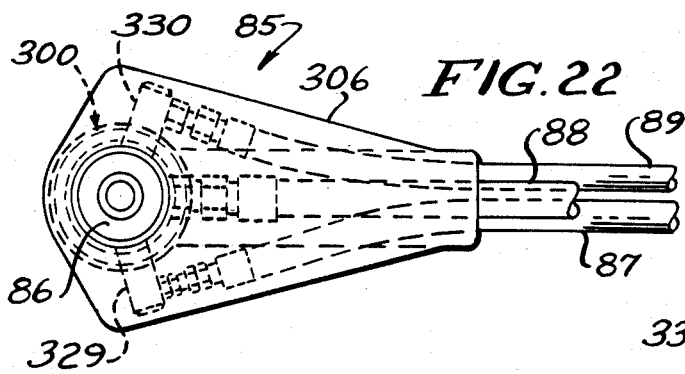
FIG. 22 is an enlarged top plan view of the welding unit of FIG. 3, taken generally along the line 22—22 in FIG. 3.

Referring to FIG. 1 there is illustrated an arc welding system, generally designated by the numeral 50, of the type for use in robotic welding applications. More specifically, an associated robot machine (not shown) of known construction has a robot arm 51 provided with an articulated wrist 52 at the distal end thereof, which carries a gun mounting bracket 53. Mounted in the gun mounting bracket 53 is an arc welding unit 54 for performing welding operations at a welding station 56. Typically, the robot arm 51 and the wrist 52 will move, under computer program control, as necessary to cause the welding unit 54 to follow a predetermined weld path along an associated workpiece (not shown). The welding unit 54 includes a docking body 100 to which is releasably coupled a welding gun or torch assembly 55, including a water-cooled machine barrel assembly 140 and a water-cooled nozzle assembly 220, all in accordance with a first embodiment of the present invention, as will be explained in greater detail below.

Utilities may be supplied to the welding unit 54 by a movable utilities station 60, which may be of the type disclosed in my U.S. Pat. No. 4,210,796, the disclosure of which is incorporated herein by reference. Typically, the utilities station 60 is supported overhead on a boom or other structure carrying a manifold system which may supply a plurality of utilities stations 60, one for each of a number of robot machines. Associated with the utilities station 60 is a wire feeder 61 which feeds a consumable wire electrode M from an associated supply into a wire guide in the utilities station 60. Also supplied to the utilities station 60 are cooling water W via a conduit 62 and arc shielding gas G via a conduit 63, the recirculated cooling water being returned to a suitable drain D via a conduit 64. Electric welding potential E is applied to the utilities station 60 through a power cable 65. The utilities are then delivered from the utilities station 60 to the welding unit 54 via a number of conduits encased in a delivery conduit sheath 70. Specifically, the sheath 70 encloses a wire electrode casing 71, a water inlet hose 72, a water drain hose 73 in which is embedded a power cable, and a gas inlet hose 74. The sheath 70 and the associated conduits all have a length sufficient to accommodate the programmed movement of the welding unit 54.

Referring to FIG. 2, there is illustrated a modified form of welding unit 76, for use in the arc welding system 50. The welding unit 76 differs from the welding unit 54 of FIG. 1, in that in the welding unit 76 there is releasably mounted on the docking spool 100 a welding gun assembly 75, in which there is substituted for the machine barrel 140 a curved gun 230, on which the nozzle assembly 220 is mounted. The curved gun 230 is interchangeable with the machine barrel 140 and is useful in applications in which the workpiece is disposed in a position which would be difficult to reach with the straight machine barrel 140.

Referring to FIG. 3, there is illustrated an alternative version of the present invention, designed for use with fixed or dedicated mechanized welding applications. More specifically, in this version a fixed mounting plate 80 on a robot or other welding machine carries a wire feeder 81 of known construction which supplies the metal wire electrode M from an associated supply reel 82, which is also fixedly mounted on the plate 80. Also carried by the plate 80 is a welding unit 85 which includes a wire guide 86 for receiving and guiding the wire electrode M from the wire feeder 81 to an associated docking body 300, on which is mounted the welding gun assembly 55 of FIG. 1.

Communication between the docking body 300 and the associated utilities supplies and the water drain is provided by a water inlet hose 87, a water outlet hose 88 in which is embedded a power cable, and a gas inlet hose 89, these three hoses all being enclosed adjacent to the docking body 300 by a sheath 306 which also covers the upper end of the docking body 300. It will be appreciated that the welding unit 85 is utilized in applications which do not require it to undergo complex movement to follow a welding path, or where the workpiece is moved relative to the welding unit 85.

The docking body 300 is designed so that it can interchangeably accept the curved gun 230 in place of the machine barrel 140. However, in practice, this is generally not necessary since in the fixed or dedicated applications with which the welding unit 85 is designed to be used, the dedicated mount on the associated machine would be especially designed to provide the necessary access to the workpiece.

The construction and operation of the welding unit 54 of FIG. 1 will now be described in greater detail. Referring to FIGS. 4-12 of the drawings, the docking body 100 includes a solid cylindrical metal body 101, which may be formed of brass. The body 101 has an annular channel or recess 102 formed in the outer surface thereof adjacent to the input end thereof for receiving a clamp 103 (see FIGS. 1 and 5) securely to clamp the adjacent end of the delivery conduit sheath 70. Also formed in the outer surface of the body 101 is a circumferential groove 104 (FIGS. 11 and 12) in which is received a resilient split positioning ring 105, for a purpose to be explained more fully below. The output end of the body 101 is externally threaded, as at 106. The body 101 has circular input and output end faces 107 and 108 between which is formed an axial bore or passage 110.

Referring in particular to FIGS. 11 and 12, the passage 110 has an enlarged counterbore portion 111 in its output end defining an annular shoulder 112. Also extending through the body 101 from the input face 107 to the output face 108 is a gas passage 113 (FIG. 12) which has an enlarged counterbore portion 114 at the output end thereof opening to the output face 108. The gas passage 113 has an offset portion 115 adjacent to the other end thereof which terminates in a counterbore portion 116 which opens to the input face 107.

Also extending through the body 101 from the input face 107 to the output face 108 are a water input passage 117 and a water drain passage 118 which are similar in construction and are both substantially parallel to the axial passage 110. Each of the passages 117 and 118 has an enlarged-diameter counterbore portion 119 at its input end which communicates via a slightly offset portion 120 with the main passage. Each of the passages 117 and 118 is also provided adjacent to the output end thereof with a plurality of successively larger-diameter counterbore portions 121, 122, 123 and 124.

A wire guide fitting 126 is received in the input end of the axial passage 110 for guiding the metal wire electrode M from the electrode casing 71 into the passage 110. The fitting 126 is provided with a circumferential groove 127 which receives a set screw 128 threadedly engaged in a radial bore 129 in the body 101 for axially retaining the fitting 126 in place (see FIG. 11), while permitting rotational movement thereof about its axis. Respectively brazed in place in the counterbore portions 116 and 119 of the passages 113, 117, and 118 are a water input fitting 130, a water drain fitting 131 and a gas fitting 132. Each of these fittings is provided with an externally threaded portion adapted to be threadedly coupled to a mating fitting at the end of the associated one of the conduits 71-74 for transferring water and gas to the body 101 and receiving water from the body 101. In this regard, it will be appreciated that the water drain fitting at the end of the drain hose 73 is designed to also terminate the electric power cable which is carried within the drain hose 73. Accordingly, the electrical welding potential is coupled via the fitting 131 to the conductive metal body 101 in a known manner.

Each of the water passages 117 and 118 is provided with a check valve 135 (FIGS. 11 and 12) which includes a helical compression spring 136 seated in the counterbore portion 121 for resiliently urging a valve ball 137, disposed in the counterbore portion 122, against an annular seat 138 which is threadedly engaged in the counterbore portion 123, for closing the passage therethrough.

Referring to FIGS. 4, 5 and 13-16, the machine barrel assembly 140 includes a cylindrical body housing 141 formed of an electrically insulating material, and having successively larger-diameter counterbore portions 142 and 143 in the input end thereof. The outer surface of the body housing 141 has a reduced-diameter portion 144 at its output end which is telescopically received in a cylindrical metal sleeve 145 which is externally threaded at its distal end, the sleeve 145 being fixedly secured, as by a suitable adhesive, to the body housing 141. Formed in the inner surface of the body housing 141 adjacent to its output end are two circumferentially spaced-apart, part-cylindrical recesses 146 (see FIGS. 5 and 13). A radial bore 147 is formed in the body housing 141 for receiving an associated set screw 148.

There is disposed in the body housing 141, adjacent to its output end, an inner body member 150 having a radial bore 149 therein adapted to threadedly receive the set screw 148, fixedly to position the inner body member 150 in a mounted position, illustrated in FIG. 4 in the body housing 141. The inner body member 150 is a generally cylindrical structure having annular flanges 151 and 152, respectively disposed adjacent to the opposite ends thereof. The outer surface of the inner body member 150 has circumferentially spaced-apart recesses 153 therein extending between the flanges 151 and 152. The inner body member 150 is also provided with two circumferentially spaced-apart, part-cylindrical grooves 154 with extend through the flanges 151 and 152 and which intercept two of the recesses 153 (see FIGS. 5 and 14). When the inner body member 150 is disposed in its mounted position, illustrated in FIG. 4, the grooves 154 are respectively disposed opposite the recesses 146 in the body housing 141 for cooperation therewith to form two generally cylindrical channels extending between the body housing 141 and the inner body member 150, parallel to the longitudinal axis thereof. Integral with the inner body member 150 at the input end thereof and extending longitudinally therefrom is an extension portion 155. A cylindrical bore 156 extends axially through the inner body member 150 and the extension portion 155, the bore 156 having a counterbore portion 157 at its input end and provided at its output end with an arcuate counterbore portion 158 and a slightly larger-diameter counterbore portion 159 (FIGS. 15 and 16).

Also formed in the inner body member 150 is an elongated gas passage 160 which extends from the flange 151 to a point spaced a slight distance from the output end of the inner body member 150. The gas passage 160 has a counterbore portion 161 at its input end and at its output end it communicates with a bore 162 with extends radially through the flange 152 to the counterbore portion 159 of the bore 156. In use, the outer end of the radial bore 162 is closed, as by a plug 163. Also extending longitudinally into the inner body member 150 from the flange 151 is a water input passage 164 having a counterbore portion 165 at its input end and provided at its output end with an angled spur portion 166 which communicates with the counterbore portion 158 of the axial bore 156. In like manner, there is provided a water output passage 167 having a counterbore portion 168 at the input end of the body member 150, and having at its other end an angled spur portion 169 which communicates with the arcuate counterbore portion 158 (see FIG. 16).

Fixedly secured to the inner body member 150 at the output end thereof is an output fixture 170, which is of known construction and cooperates with the inner body member 150 to form the inner body of the welding gun assembly 55, analogous to the inner body construction disclosed in my U.S. Pat. No. 3,775,584. The output fixture 170 includes a cylindrical inner tube 171 (FIG. 16) having a reduced-diameter tip 172 which is received in the axial bore 156. The inner tube 171 also has a radially outwardly extending annular flange 174 dimensioned to seat at the bottom of the counterbore portion 158 of the axial bore 156 and is there brazed in place. The outer end of the inner tube 141 projects well beyond the output end of the inner body member 150 and is internally threaded, as at 175.

Telescopically received over the outer end of the inner tube 171 is a cylindrical sleeve 176, having a diameter slightly greater than the diameter of the counterbore portion 158 of the bore 156. The sleeve 176 has a reduced-diameter end 177 adapted to be slidingly received into the counterbore portion 158 and brazed to the inner body member 150. The sleeve 176 is dimensioned to be spaced radially from the inner tube 171, except at the outer ends thereof where they are brazed together, the sleeve 176 and the tube 171 cooperating to define therebetween an annular chamber 178 which communicates at its inner end with the radial bore 162 of the gas passage 160. Formed in the sleeve 176 adjacent to the outer end of the chamber 178 are a plurality of circumferentially spaced-apart gas exit holes 179.

Removably mounted on the output fixture 170 is a welding tip assembly, generally designated by the numeral 180, which is substantially of conventional construction. The tip assembly 150 includes a tubular adapter 181 provided with an externally threaded lug 182 at one end thereof adapted to be threadedly engaged with the internally threaded portion 175 of the output fixture 170 and locked in place by a jam nut 183. Flats 184 may be formed on the outer surface of the adapter 181 to receive an associated tool to facilitate mounting and demounting of the adapter 181. Threadedly received in the adapter 181 at its distal end is a contact tip 185.

It will be appreciated that the tip assembly 180 guides the welding wire electrode M to the associated workpiece, the contact tip 185 preferably having an inner diameter only very slightly greater than the diameter of the welding wire electrode M. In this regard, there is typically provided a flexible wire support liner 186 which extends through the axial bore 156 in the inner body member 150 and through the output fixture 170 and the adapter 181 to provide accurate guiding of the metal electrode wire M therethrough. The wire support liner 186 has an enlarged head 187 for support purposes, as will be explained more fully below. While a threaded contact tip 185 has been illustrated, it will be appreciated that other known types of contact tips, such as that disclosed in FIG. 18 of the aforementioned copending U.S. application Ser. No. 648,966, could be utilized.

The machine barrel assembly 140 also includes an elongated center tube 190 having a reduced diameter end 191 which is telescopically received in the counterbore portion 157 of the axial bore 156 in the inner body member 150, and is there brazed in place. The tube 190 has a counterbore portion 192 at one end in which the head 187 of the wire support liner 186 is seated for supporting it and preventing it from falling out when the contact tip 185 is removed. There is also provided an elongated metal gas tube 193 having one end thereof received in the counterbore portion 161 of the gas passage 160 in the inner body member 150, and being brazed thereto. A metal water output tube 194 has one end thereof received in the counterbore portion 168 of the water output passage 167 and is brazed to the inner body member 150. A water fitting 195 is received in the counterbore portion 165 of the water input passage 164 of the inner body member 150 and is brazed thereto. The fitting 195 is externally threaded and is adapted for threaded engagement with one of two fittings 196 which are respectively coupled to the opposite ends of a flexible water output hose 197, the other end of which is folded back upon itself and extends through one of two insulating sleeves 188 to the output end of the machine barrel assembly 140. The insulating sleeves 188 are respectively disposed in the channels formed by the recesses 146 in the body housing 141 and the grooves 154 in the inner body member 150. There is also provided a flexible water input hose 198 provided at its opposite end with threaded fittings 199, and received through the other one of the insulating sleeves 188.

The machine barrel assembly 140 also includes a cylindrical metal coupling body 200, which may be formed of brass, and is provided at one end thereof with a radially outwardly extending annular flange 201. A cylindrical bore 202 extends axially through the coupling body 200 for receiving therethrough the center tube 190 which is brazed to the coupling body 200. Also extending through the coupling body 200 parallel to the axial bore 202 is a gas passage 203, having counterbore portions 204 and 205 respectively formed at the opposite ends thereof. A water input passage 206 and a water output passage 207 also extend through the coupling body 200 parallel to the axial bore 202, each of the passage 206 and 207 having counterbore portions 208 and 209, respectively formed at the opposite ends thereof. An externally threaded fitting 209a is brazed in place in the counterbore portion 209 of the water input passage 206.

In use, the fitting 209a is threadedly coupled to the fitting at the inner end of the water input hose 198. The inner ends of the gas tube 193 and the water output tube 194 are respectively brazed in place in the counterbore portions 205 and 209 of the gas passage 203 and the water output passage 207. Thus, it will be appreciated that the inner body member 150, the coupling body 200 and the interconnecting tubes 190, 193 and 194 cooperate to form a rigid inner body structure which is received in the body housing 141 of the machine barrel assembly 140, the coupling body 200 being received in the counterbore portion 143 of the body housing 141. The coupling body 200 has a length greater than the depth of the counterbore portion 143, so that a portion of the coupling body 200 extends outwardly beyond the adjacent end of the body housing 141.

Respectively received in the counterbore portions 208 of the water input and output passages 206 and 207 are two substantially identically constructed water transfer fittings 210, both being brazed to the coupling body 200 and projecting a predetermined distance outwardly from the input end thereof. Each of the fittings 210 is substantially tubular, being provided with two longitudinally spaced-apart circumferential grooves 211 in which are respectively received O-ring seals 212. Each of the fittings 210 is provided with a tubular actuator tip 213 having slots 214 in the side surface thereof adjacent to the distal end thereof, for a purpose to be explained more fully below. There is also provided a tubular gas fitting 215 which is brazed in place in the counterbore portion 205 of the gas passage 203. The fitting 215 has a counterbore portion 216 in the distal end thereof and is provided at its outer surface with a pair of longitudinally spaced-apart circumferential grooves 217 in which are respectively received O-ring seals 218. Preferably, the distal ends of the fittings 210 and 215 are beveled, as at 219.

Referring now to FIGS. 4 and 5, the nozzle assembly 220 may be of the type disclosed in my U.S. Pat. No. 3,496,328, or in my U.S. Pat. No. 3,775,584, the disclosures of which are incorporated herein by reference. In general, the nozzle assembly 220 includes a cylindrical outer tube 221 having brazed thereto at one end thereof an annular mounting collar 222. Disposed in abutting relationship with the mounting collar 222 is an electrical insulator collar 223. Water fittings 225 extend through complementary apertures in the insulator collar 223 and are brazed to the mounting collar 222, communicating respectively with associated passages in the mounting collar 222 which, in turn, communicate with passages (not shown) extending longitudinally of the outer tube 221. Secured to the distal end of the outer tube 221 is a gas nozzle 226. A cone nut 227 is received over the nozzle assembly 220 and is adapted for threaded engagement with the threaded sleeve 145 of the machine barrel assembly 140, with the fittings 225 being respectively threadedly engaged with the fittings 196 and 199 at the outer ends of the water hoses 197 and 198, respectively, of the machine barrel assembly 140, thereby fixedly to mount the nozzle assembly 220 in place on the machine barrel assembly 140. Another cone nut 228 is telescopically received over the machine barrel assembly 140 and is adapted for threaded engagement with the externally threaded portion 106 of the docking body 100. An inner flange 228a on the cone nut 228 is engageable with the flange 201 on the coupling body 200, as explained below. The cone nut 228 is surrounded with an electrically insulating jacket 229.

In assembly, the of the inner body member 150 and the coupling body 200 are first brazed together. Specifically, the output fixture 170 is brazed to the inner body member 150, and then the interconnecting tubes 190, 193 and 194 are brazed to the inner body member 150 and the coupling body 200 to form an integral inner body structure. Then, the body housing 141 is inserted into the output end of the cone nut 228, seating against the flange 228a. The assembled inner body structure is then inserted, output fixture 170 first, into the body housing 141 through the cone nut 228, with the part-cylindrical grooves 154 respectively facing the part-cylindrical recesses 146 in the body housing 141 for cooperation therewith to define channels to receive the insulating sleeves 188. The water input hose 198 is received through one of the insulating sleeves 188, while the water output hose 197 is folded back on itself, as indicated in FIG. 4, and its distal end is received through the other one of the insulating sleeves 188. The inner body member 150 is then locked in place in the body housing 141 by the set screw 148.

In this assembled condition, the output face of the inner body member 150 is substantially flush with the output end of the body housing 141, and the flange 201 of the coupling body 200 is disposed on the opposite side of the cone nut flange 228a from the body housing 141.

The operation of the welding unit 54 will now be explained. Initially, the docking body 100 is coupled to the utilities delivery hose conduits 71–74 by the fittings 126, 130, 131 and 132, and the sheath 70 is clamped around the body 101 with the clamp 103. Then, the threaded end 106 of the body 101 is dropped into the gun mounting bracket 53, the positioning ring 105 engaging the top of the mounting bracket 53 to limit the depth of insertion of the body 101 therein. This accurately positions the docking body 100 with respect to the robot wrist 52 and, therefore, with respect to the associated workpiece. The mounting bracket 53 is secured tightly about the docking body 100.

The welding unit 54 is now ready for mounting of the welding gun assembly 55. In this regard, it is a fundamental feature of the present invention that the welding gun assembly 55 can be quickly and easily manually mounted and demounted with respect to the docking body 100, without the use of tools, the machine barrel assembly 140 being simply plugged into the docking body 100. Specifically, the water transfer fittings 210 are respectively received in the receptacles formed by the multiply-counterbored portions of the water passages 117 and 118, the gas fitting 215 is received in the counterbore portion 114 of the gas passage 113, and the distal end of the center tube 190 is received in the axial passage 110 until the coupling body 200 abuts the output face 108 of the body 101, as is best illustrated in FIG. 4.

In this mounted condition the water transfer fittings 180 cooperate with the passages 117 and 118 and the gas fitting 215 cooperates with the passage 113 and the center tube 190 cooperates with the passage 110 to form plug-and-socket type couplings, the counterbore portions 124 frictionally receiving the O-ring seals 212 therein in sealing relationship therewith, and the counterbore portion 114 frictionally receiving the O-ring seals 218 therein in sealing relationship therewith. The actuator tips 213 are respectively received through the annular seats 138 of the check valves 135 for depressing the balls 137 against the urging of the compression springs 136 to open the check valves 135 and permit the free flow of water through the passages 117 and 118. The cone nut 228 is then threadedly engaged with the threaded portion 106 of the docking spool body 101, the flange 228a engaging the flange 201 of the coupling body 200 securely to lock the machine barrel assembly 140 in its mounted condition, illustrated in FIG. 1, with the input face of the coupling body 200 abutting the output end face 108 of the docking body 100.

The nozzle assembly 220 may be mounted on the machine barrel assembly 140, either before or after the machine barrel assembly 140 is mounted on the docking body 100. The fittings 225 are threadedly coupled to the fittings 196 and 199 on the water hoses 197 and 198, respectively, of the machine barrel assembly 140. Then, the cone nut 227 is fitted up over the nozzle assembly 220 and threadedly engaged with the metal sleeve 145 on the machine barrel assembly 140, the flange 227a on the cone nut 227 engaging the mounting collar 22 on the nozzle assembly 220 for drawing the nozzle assembly 220 up into firm engagement with the machine barrel assembly 140, until the insulator collar 223 abuts the output end face of the inner body member 150. In this regard, it will be appreciated that there is sufficient clearance in the insulating sleeves 188 and there is sufficient play in the hoses 197 and 198 and the fittings thereof, so that the fittings 196 and 199 can initially be pulled out of the insulating sleeves 188 a sufficient distance to threadedly engage with the fittings 225, and can then be retracted into the insulating sleeves 188 when the nozzle assembly 220 is drawn up tightly into its mounted condition.

When the welding unit 54 is thus assembled, the arc shielding gas flows through the gas passage 114 in the body 101 into the gas fitting 225 through the gas passage 203 in the coupling body 200, the gas tube 193 and the gas passage 160 in the inner body member 150, into the annular chamber 178 in the output fixture 170, through the gas exit holes 179 therein into the nozzle assembly 220, and the gas nozzle 226, where it surrounds the contact tip 185 to shield the welding arc in a known manner.

The cooling water flows through the water input passage 117 and the open check valve 135 therein and through the slots 214 in the actuator tip 213 of the corresponding water transfer fitting 210. The water then flows through the water transfer fitting 210, the water input passage 206 in the coupling body 200, the water input hose 198, the associated fitting 225 and the associated port of the mounting collar 222 to a channel in the nozzle assembly 220. Water then flows down along the nozzle assembly 220, circulates around the distal end thereof and flows back up along another channel to the other fitting 225 to cool the nozzle assembly 220 in a known manner.

The water then flows through the water output hose 197 and the fitting 195 into the passage 164 in the inner body member 150, and thence into the arcuate counterbore portion 158 of the axial bore 156 and out through the water output passage 167, thereby cooling the inner body member 150. The water then flows through the water output tube the water output passage 207 in the coupling body 200, and thence through the associated water transfer fittin 210 and the water drain passage 118 of the docking body 100 via the open check valve 135 therein to the water drain hose 73.

It will be appreciated that the electrical welding current is applied to the metal wire electrode M through the body 101, the cone nut 228, the coupling body 200, the metal center tube 190, the inner body member 150, the output fixture 170 and the tip assembly 180, which are all in electrical contact with one another, in a known manner. Also, it can be seen that the insulator collar 223, insulating sleeves (not shown) in the nozzle assembly 220, the insulating sleeves 188 in the insulating body housing 141, and the insulating jacket 229 on the cone nut 228 insure complete electrical insulation of the exterior of the nozzle assembly 220 and the user from the welding potential.

When it is desired to remove the welding gun assembly 55, such as when the gas nozzle 195 becomes clogged with welding spatter, or is damaged, or for any other reason, one need only unscrew the cone nut 228 and simply pull the gun assembly 55 from the docking body 100. The bias springs 136 will automatically close the check valves 135 to prevent any water spillage from the docking body 100, thus obviating disconnection or the cooling water at the water supply. A new gun assembly 55 can be simply and easily installed in place in the manner described above, without any necessity for using tools or for in any way disturbing the docking body 100 or any other part of the welding unit 54 or the arc welding system 50, including the utilities supplies.

If it were necessary to change the tip assembly 150 for any reason, this could very easily be done also, by simply removing the nozzle assembly 220 and then the tip assembly 180. While it would require the use of a wrench or the like, it would not necessitate disturbing the docking body 100 or any other part of the arc welding system 50, including the utilities supplies. It will also be appreciated that if the docking body 100 needs to be removed, for servicing or any other reason, it can be reinstalled without loss of the critical positioning with respect to the associated robot, since the positioning ring 105 will insure that it is repositioned at exactly the same distance from the workpiece. Thus no recalibration of the welding system 50 will be necessary and the welding program can be resumed where it was interrupted.

Referring now to FIGS. 17–21, the curved gun 230 will be described. The curved gun 230 has a curved metal body housing 231 which is generally tubular and is provided with a reduced-diameter, externally threaded portion 232 at one end thereof. The bore through the body housing 231 has a counterbore portion 233 at the input end thereof and a counterbore portion 234 at the output end thereof. A cylindrical sleeve 235 of electrically insulating material is telescopically received in the output end of the body housing 231, the sleeve 235 having two part-cylindrical recesses 236 at circumferentially spaced-apart locations along its inner surface. A radial bore 237 is formed in the body housing 231 and receives an insulating washer 238, which in turn is adapted for receiving an associated screw 239 which extends through a complementary opening 237a in the sleeve 235 for a purpose to be explained more fully below.

The output end of the body housing 231 has an axis which is inclined at an angle of about 30° to the axis of the input portion of the body housing 231. However, it will be appreciated that the body housing 231 could be formed with other degrees of curvature, as desired for particular applications. A cylindrical extension tube 240 of electrically insulating material has a reduced-diameter portion 241 at one end thereof which is adapted to be telescopically received in the counterbore portion 233 of the body housing 231, coaxially therewith. The input end of the body housing 231 is split and is provided with two tabs 243 on the split portions which are adapted to receive therethrough a screw 244 to pull the two tabs together, thereby to tighten the split portion of the body housing 231 around the extension tube 240.

The curved gun 230 also includes an inner body member 150 which is substantially identical to that described above in connection with the machine barrel assembly 140. The inner body member 150 is adapted to be disposed in the insulating sleeve 235 with the part-cylindrical grooves 154 disposed respectively opposite the part-cylindrical recesses 236 for cooperation therewith to receive insulating sleeves 188, in the same manner as described above in connection with FIGS. 4, 5 and 13.

There is provided a curved center tube 250 having a reduced-diameter end 251 which is received in the counterbore portion 157 of the axial bore 156 in the inner body member 150, and is there brazed in place. There are also provided a curved gas tube 253 and a curved water output tube 254, the output ends of which are respectively received in the counterbore portion 161 of the gas passage 160 and the counterbore portion 168 of the water output passage 167 in the inner body member 150, being there brazed in place. Similarly, an externally threaded curved water output fitting 255 is brazed in place in the counterbore portion 165 of the water input passage 164 of the inner body member 150. The fitting 255 is threadedly engaged with one of two fittings 256 which are respectively coupled to the opposite ends of a water output hose 257. A water input hose 258 is provided having threaded fittings 259 at its opposite ends.

The curved gun 230 also includes a cylindrical rear inner body member 260, which is preferably formed of a metal such as brass, and has an axial bore 261 extending therethrough. The axial bore 261 has a counterbore portion 262 at its output end in which is received the other end of the center tube 250 for brazing to the rear inner body member 260. There are also formed through the rear inner body member 260 a gas passage 263 and water input and output passages 264 and 265, all extending parallel to the axial bore 261, each of these passages 263–265 having a counterbore portion 266 at its output end and a shallow counterbore portion 267 at its output end. The adjacent ends of the gas tube 253 and the water output tube 254 are received in the counterbore portions 266 of the gas passage 263 and the water output passage 265, respectively, and an externally threaded fitting 266a is received in the counterbore portion 266 of the water input passage 264, the fitting 266a and the tubes 253 and 254 all being brazed to the rear inner body member 260. The fitting 266a is threadedly engaged with the fitting 259 on the adjacent end of the water input hose 258. 0-ring seals 268 are respectively seated in the shallow counterbore portions 267 of the passages 263–265. There are also formed in the input face of the rear inner body member 260 four internally threaded screw holes 269.

The curved gun 230 also includes a cylindrical coupling body 270, formed of a metal, such as brass, and provided at one end thereof with a radially outwardly extending annular flange 271. The coupling spool 270 has a reduced-diameter portion 272 at its outer end with a diameter substantially the same as that of the rear inner body member 260. Formed through the coupling spool 270 are an axial bore 273, a gas passage 274 and water passages 275 and 276, the latter three passages all having counterbore portions 277 at the input ends thereof. Also formed through the coupling body 270 are four bores 278, respectively receiving screws 279 which are threadedly engaged in the holes 269 of the rear inner body member 260 to the rear inner body member 260 and the coupling body 270 together.

A center tube 280 is received through the axial bore 273 of the coupling body 270 and is seated in the axial bore 261 of the rear inner body member 260, preferably being brazed thereto. The center tube 280 projects a predetermined distance outwardly beyond the input end of the coupling body 270 and is provided at its input end with a counterbore portion 281 for seating the head 187 of a wire support liner 186, in the same manner and for the same purpose as was described above in connection with the machine barrel assembly 140. Water transfer fittings 210 and a gas fitting 215, identical to those described above in connection with the machine barrel assembly 140, are respectively brazed in the counterbore portions 277 of the passages 274–276.

In assembly, it will be appreciated that the inner body member 150, the tubes 250, 253 and 254 and the rear inner body member 260 all form an integral inner body structure which is received in the body housing 231 through the extension tube 240. When thus assembled, the inner body member 150 is disposed in the insulating sleeve 235 and is secured in place with the set screw 239, the free end of the hose 258 being disposed through one of the insulating sleeves 188 and the free end of the other hose 257 being folded back on itself and extending through the other insulating sleeve 188. The length of the parts is such that the rear inner body member 260 is disposed adjacent to the rear or input end of the extension tube 240.

A cone nut 288 having an insulating jacket 289 thereon is received over the input end of the extension tube 240, with the tube 240 seating against an internal flange 288a on the cone nut 288, in the same manner as was described above in connection the machine barrel assembly 140. The coupling body 270 is then inserted into the extension tube 240 through the cone nut 288 and secured to the rear inner body member 260 by the screws 279, the parts being so dimensioned that the flange 271 on the coupling body 270 will be adapted to bear against the outer surface of the internal flange 288a in the cone nut 288. Preferably, the screw bores 278 are counterbored so that the heads of the screws 279 can be recessed in the input face of the coupling body 270.

The nozzle assembly 220 or other similar nozzle assembly may be mounted on the curved gun 230 in exactly the same manner as it is mounted on the machine barrel assembly 140, as explained above. Similarly, the operation of the curved gun 230 is substantially the same as that of the machine barrel assembly 140, being capable of being plugged into the docking body 100 in substantially the same manner as was explained above with respect to the machine barrel assembly 140. When the cone nut 288 is threaded onto the docking body 100, the flange 288a engages the flange 271 on the coupling body 270 securely to pull it into abutting engagement with the output end face 108 of the docking body 100. It will also be appreciated that when the coupling body 270 is secured to the rear inner body member 260, the 0-ring seals 268 serve to effectively seal the communication between the passages 263–265 and the passages 274–276 to permit the flow of gas and water therethrough without leakage.

The welding unit 85 illustrated in FIG. 3 will now be described. Referring also to FIGS. 22–25, the docking body 300 includes a solid cylindrical metal body 301, which may be formed of brass. The body 301 has an enlarged-diameter portion 302 which has an externally threaded end 303. Formed in the outer surface of the enlarged-diameter portion 302 is a circumferential groove 304 which is adapted to receive therein an annular lip (not shown) of the sheath 306 for attaching the sheath 306 to the body 301.

Figure 24:
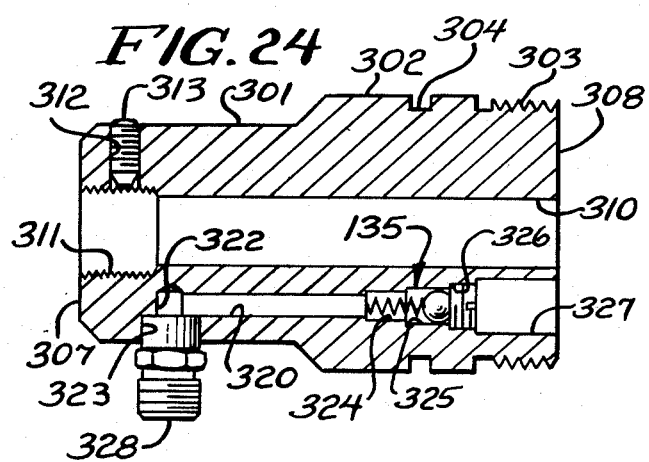
FIG. 24 is a view in vertical section taken along the line 24—24 in FIG. 23, and rotated 90° counterclockwise.
Figure 25:
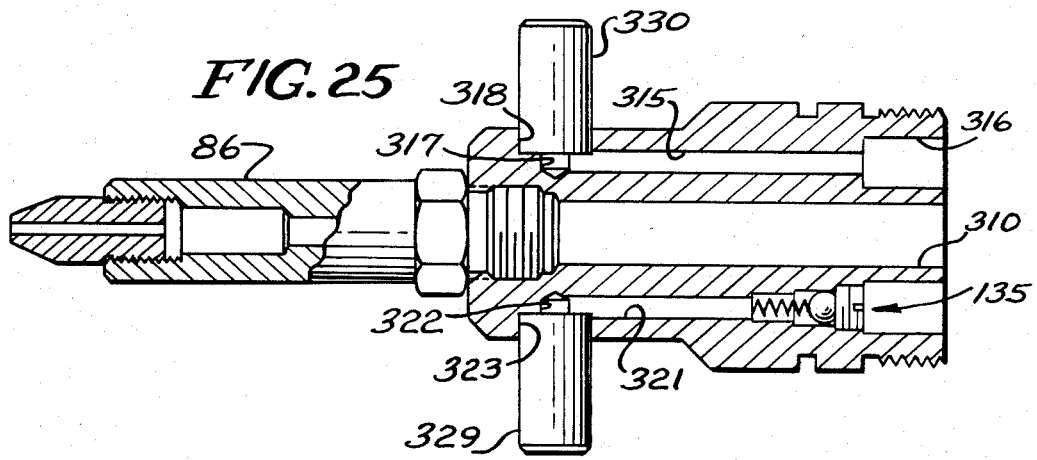
FIG. 25 is a view in vertical section taken along the line 25—25 in FIG. 23, rotated 90° counterclockwise and including the wire guide of the associated welding unit.

The body 301 has a circular input end face 307 and a circular output end face 308, between which extends an axial cylindrical passage 310 through the body 301. The passage 310 has an enlarged-diameter, internally-threaded counterbore portion 311 at its input end. The wire guide 86 is threadedly engaged in the counterbore portion 311 of the passage 310, being locked in place by a set screw 313 which is threadedly engaged in a radial bore 312 in the body 301 (FIG. 24).

Extending longitudinally through the body 301 is a gas passage 315 having a counterbore portion 316 at its output end and being provided with a radially extending input portion 317 spaced a predetermined distance from the input face 307 of the body 301. The radial input portion 317 is provided with an enlarged-diameter counterbore portion 318. Also formed in the body 301 are a water input passage 320 (FIG. 24) and a water drain passage 321 (FIG. 25), each extending from the output face 308 of the body 301 substantially parallel to the axial passage 310, and terminating short of the input face 307, and each of which is provided with a radial portion 322 spaced from the input face 307 of the body 301. Each of the radial portions 238 has an enlarged-diameter counterbore portion 323. Each of the water passages 320 and 321 is also provided with successively larger-diameter counterbore portions 324, 325, 326 and 327, each of these passages being provided with a check valve 135 identical to that described above in connection with the welding unit 54.

Figure 23:
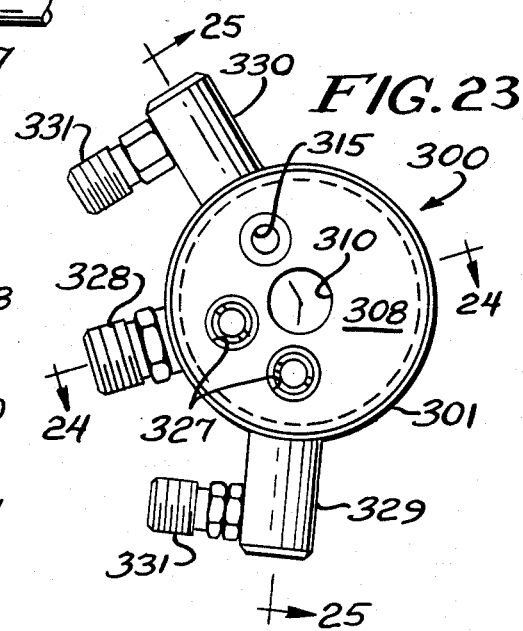
FIG. 23 is a further enlarged bottom plan view of the docking body of FIG. 22, rotated 180°.

Fittings 328, 329 and 330 are respectively seated and brazed in place in the counterbore portions 323 of the water passages 320 and 321 and the counterbore portion 318 of the gas passage 315. The fittings 329 and 330 are each provided with a connector 331 projecting perpendicularly therefrom, as is best illustrated in FIG. 23. The connectors 331 and the fitting 328 are all arranged so that their axes converge to one side of the body 301 to facilitate consolidation of the associated utilities conduits in the common sheath 306. In this regard, it will be appreciated that the sheath 306 is adapted to enclose the fittings 328-330.

The assembly and operation of the welding unit 85 is substantially similar to those of the welding unit 54. Initially, the fittings 328, 329 and 330 are coupled to the utilities supply hoses 87-89 and the sheath 306 is mounted in place. The wire guide 86 is mounted on the docking body 300 and then locked in place in the wire feeder 81 for supporting the welding unit 85.

The welding gun assembly 55 may then be manually plugged into the docking body 300 in substantially the same manner as was explained above with respect to the welding unit 54, and locked in place by the cone nut 228. The water transfer fittings 210 operate the check valves 135 in the same manner as was described above with respect to the embodiment of FIG. 1. The gas flows through the fitting 330 and the gas passage 315 to the gas passage 213 in the coupling body 200 of the machine barrel assembly 140. The water flows in through the fitting 329, the passage 320, the corresponding one of the water transfer fittings 210 and thence to the water passage 206 in the coupling body 200. Water returning to the drain flows from the coupling body 200 through the other water transfer fitting 210 to the drain passage 321 in the body 301, and then out through the fitting 328.

While the welding gun assembly 55 has been illustrated in connection with the welding unit 85, it will be appreciated that other styles of water-cooled welding gun assemblies could be used, such as the curved gun 230 described above, although the dedicated welding machines with which the welding unit 85 is intended to be used will normally be designed to provide the necessary access to the workpiece, so as to obviate use of a curved gun 230. Thus, it can be seen that it is a significant aspect of the present invention that a variety of different types of water-cooled welding gun assemblies can all be interchangeably mounted on the docking bodies 100 or 300, without necessitating any disconnection or other alteration of the rest of the welding system 50, and in particular the utilities supplies.

From the foregoing, it can be seen that there has been provided an improved welding system and a docking assembly therefor which is of simple and economical construction, and which affords simple and quick manual mounting and demounting of welding gun or torch assemblies without the use of tools and without in any way affecting the utilities supplies, and without losing the precise positioning of the welding unit with respect to the workpiece.

I claim:

1. In an arc welding system including a welding torch at a welding station wherein the torch has an electrode and utilities inputs for receiving from associated delivery means utilities including at least welding voltage and arc shielding gas, a quick connect and disconnect docking assembly for readily mounting and demounting the torch comprising: a docking body disposed at the welding station and having an electrode passage and at least one other utilities passage therethrough, means electrically and mechanically connecting said docking body to the associated utilities delivery means and receiving the shielding gas into said at least one other utilities passage, first coupling means on said docking body, and second coupling means non-removably mounted on the welding torch and forming a permanent part thereof, said first and second coupling means being removably engageable with each other for mounting the welding torch on said docking body in a mounted condition and providing electrical connection therebetween with the electrode disposed in said electrode passage and with the utilities applied to the utilities inputs of the welding torch, said first and second coupling means being manually engageable and disengageable to permit mounting and demounting of the torch without the use of tools.

2. The docking assembly of claim 1, wherein said connecting means releasably connects said docking body to the associated utilities delivery means.

3. The docking assembly of claim 1, wherein said first coupling means includes an externally threaded portion on said docking body, a flange portion on the welding torch, and a nut threadedly engageably with said externally thread portion and cooperating with said docking body for clamping said flange portion therebetween.

4. The docking assembly of claim 1, wherein said docking body has a longitudinal axis, said connecting means extending substantially parallel to said axis.

5. The docking assembly of claim 1, wherein said docking body has a longitudinal axis, said connecting means including portions which extend substantially perpendicular to said axis.

6. The docking assembly of claim 1, wherein said first coupling means includes receptacle means communicating with selected ones of said passages, said second coupling means including plug-type fitting means receivable in said receptacle means.

7. The docking assembly of claim 6, wherein the utilities include cooling fluid and said docking body has plural ones of said other utilities passages therethrough, said receptacle means including two receptacles respectively communicating with two of said utilities passages, and said fitting means includes two plug-type fittings respectively receivable in said receptacles.

8. The docking assembly of claim 1, wherein said welding torch includes a curved welded gun and a welding nozzle removably mounted thereon.

9. The docking assembly of claim 1, wherein said welding torch includes a straight machine barrel and a nozzle removably mounted thereon.

10. The docking assembly of claim 1, wherein the electrode comprises a consumable wire electrode delivered from the associated delivery means, said electrode being fed through said electrode passage.

11. In an arc welding system including a welding torch assembly disposed at a welding station and having utilities inputs for receiving from associated delivery means utilities such as welding voltage, arc shielding gas, consumable wire electrode and cooling fluid, a quick connect and disconnect docking assembly comprising: a docking body disposed at the welding station and having utilities passages therethrough, means connecting said docking body to the associated utilities delivery means and receiving into said passages the wire electrode and the fluid utilities, first coupling means on said docking body, second coupling means non-removably mounted on the welding torch assembly and forming a permanent part thereof, said first and second coupling means being removably engageable with each other for mounting the welding torch assembly on said docking body in a mounted condition and providing electrical connection therebetween with the utilities applied to the utilities inputs of the welding torch assembly, valve means disposed in said passages for movement between a normal closed condition preventing flow of cooling fluid therethrough and an open condition permitting flow of cooling fluid therethrough, bias means resiliently urging said valve means to the closed condition thereof, and actuator means carried by the welding torch assembly for actuating said valve means to the open condition thereof when said welding torch assembly is in the mounted condition thereof, whereby the welding torch assembly can readily be mounted and demounted at the welding station without affecting the utilities delivery means upstream of the welding station and without a significant loss of cooling fluid.

12. The docking assembly of claim 11, wherein said first coupling means includes receptacle means in said docking body communicating with selected ones of said passages, and said second coupling means includes plug-type fitting means receivable in said receptacle means.

13. The docking assembly of claim 12, wherein said valve means is disposed in said receptacle means, said actuator means being carried by said plug-type fitting means.

14. The docking assembly of claim 11, wherein said receptacle means includes two receptacles respectively communicating with two of said passages, said valve means includes two valves respectively disposed in said two passages, said second coupling means includes two plug-type fittings respectively receivable in said receptacles, and said actuator means includes two actuator members respectively carried by said fittings for actuating said two valves.

15. The docking assembly of claim 11, wherein said docking body is substantially cylindrical in shape, said passages including a passage for the consumable wire electrode extending axially of said docking body.

16. The docking assembly of claim 11, wherein said docking body is electrically connected to the source of welding voltage, said first and second coupling means including electrically conductive means providing electrical connection between said docking body and the welding torch assembly.

17. In an arc welding system including a welding torch assembly adapted to be carried by a movable support at a welding station and having utilities inputs for receiving from associated delivery means utilities such as welding voltage, arc shielding gas, consumable wire electrode and cooling fluid, a quick connect and disconnect docking assembly for readily mounting and demounting the torch with respect to the movable support comprising: a docking body having utilities passages therethrough, mounting means on the movable support for mounting said docking body thereon in a welding position, positioning means on said docking body engageable with said mounting means accurately to position said docking body in its welding position with respect to the movable support, means connecting said docking body to the associated utilities delivery means and receiving into said passages the wire electrodes and the fluid utilities, first coupling means on said docking body, and second coupling means non-removably mounted on the welding torch assembly and forming a permanent part thereof, said first and second coupling means being removably engageable with each other for mounting the welding torch assembly on said docking body in a mounted condition and providing electrical connection therebetween with the utilities applied to the utilities inputs of the welding torch assembly, whereby the welding torch assembly can readily be mounted and demounted at the movable support without affecting the utilities delivery means upstream of the movable support.

18. The docking assembly of claim 17, wherein said mounting means includes a socket or receptacle for removably receiving said docking body therein.

19. The docking assembly of claim 18, wherein said receptacle is circular in shape, said docking body being substantially in the form of a circular cylinder.

20. The docking assembly of claim 19, wherein said positioning means includes an annular ring fixedly secured to said docking body and extending radially outwardly therefrom for engagement with said mounting means to limit the depth of insertion of said docking body in said receptacle.

* * * * *